L. S. HARVEY.
STOVE ATTACHMENT.
APPLICATION FILED SEPT. 25, 1907.
907,795.
Patented Dec. 29, 1908.
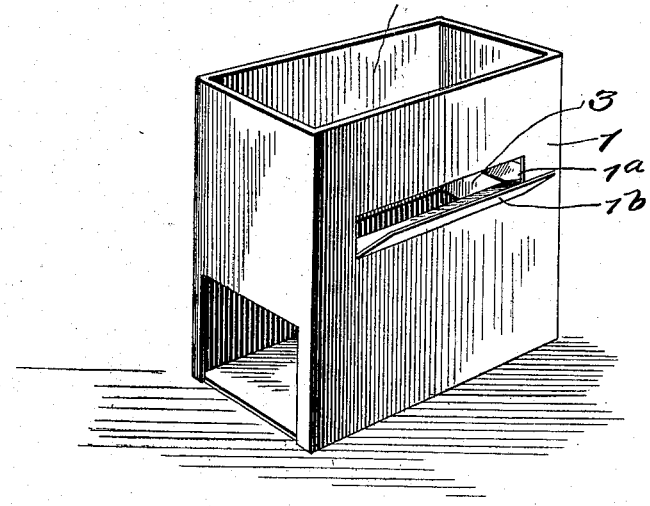
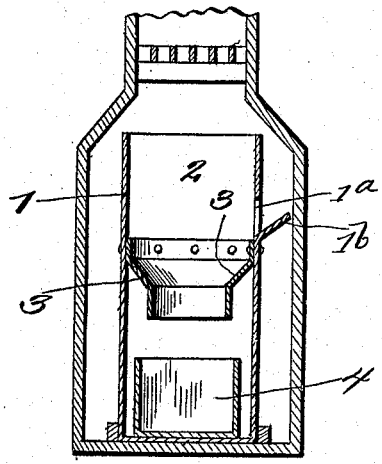
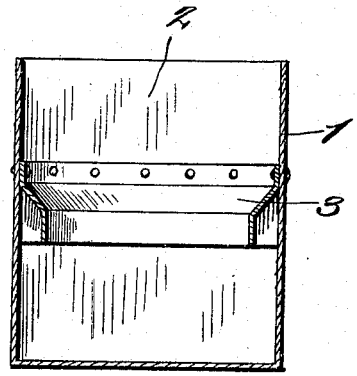
Witnesses
F. G. Boswell.
R. Cot
Inventor
L. S. Harvey
By D. Swift & Co.
Attorneys

UNITED STATES PATENT OFFICE.

LOUISA S. HARVEY, OF KNOX, INDIANA.

STOVE ATTACHMENT.

No. 907,795.

Specification of Letters Patent.

Patented Dec. 29, 1908.

Application filed September 25, 1907. Serial No. 394,468.

*To all whom it may concern:*

Be it known that I, LOUISA S. HARVEY, a citizen of the United States, residing at Knox, in the county of Starke and State of Indiana, have invented a new and useful Stove Attachment; and I do hereby declare the following to be a full, clear, and exact description of the invention, such as will enable others skilled in the art to which it appertains to make and use the same.

The invention relates to a stove attachment, and has for its object to provide a simple, efficient and inexpensive device of this character, adapted to be placed in the stove and which will facilitate the removing of ashes therefrom.

With these and other objects in view, the invention consists in the novel construction and arrangement of parts, hereinafter described and shown and particularly pointed out in the appended claim.

In the drawings, Figure 1 is a perspective view of my invention. Fig. 2 is a vertical sectional view. Fig. 3 is a similar view to Fig. 2, taken at right angles thereto.

Referring to the drawings, 1 designates the body or frame of the device, which is made of sheet metal or other suitable material, and is placed in the stove or range beneath the fire grate. Said body 1 is provided with an opening 1$^a$ from the lower portion of which extends an upwardly inclined lip or flange 1$^b$, for obvious purposes, as will be readily seen in the drawings. Heretofore, great difficulty has been experienced in preventing the ashes from spreading around and falling outside of the old-fashioned ash pan. This device is provided with a mouth 2, which is much larger than the seat of fire and which is provided with converging walls 3, so that when the ashes enter the mouth 2, they are conducted directly into a small pan 4, which is seated just below the converging portion. By this arrangement, it will be seen that the device will cause the ashes to drop into a very small pan. And it will be seen from the construction herein shown, that the pan 4, can be readily removed.

What is claimed is,

In a device as set forth, an outer casing, having an upper restricted portion for holding the fire grate, an inner casing of a width slightly greater than the width of the restricted portion and disposed directly below said restricted portion, said inner casing being provided midway of its height with an ash guide or chute comprising upper and lower vertical portions having intervening inclined walls, said upper vertical portions being riveted to the inner casing, said inner casing having an opening provided with a lip adjacent to said ash chute or guide, an ash pan or receptacle disposed directly below said ash chute or guide, said lower vertical portion of said ash chute or guide being slightly less in width than the said restricted portion and the said ash pan or receptacle so as to cause the ashes when falling from the fire grate to fully enter the said ash pan or receptacle, as and for the purpose specifically defined.

In testimony whereof I have signed my name to this specification in the presence of two subscribing witnesses.

LOUISA S. HARVEY.

Witnesses:
ABEL REA,
EMMA SIMS.